United States Patent
Tran et al.

(10) Patent No.: US 10,047,597 B2
(45) Date of Patent: Aug. 14, 2018

(54) DOWNHOLE TOOL METHODS AND SYSTEMS WITH VARIABLE IMPEDANCE CONTROL

(71) Applicant: HALLIBURTON ENERGY SERVICES, INC., Houston, TX (US)

(72) Inventors: Thanh T. Tran, Houston, TX (US); Roger L. Shelton, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 200 days.

(21) Appl. No.: 15/028,489

(22) PCT Filed: Nov. 14, 2013

(86) PCT No.: PCT/US2013/070158
§ 371 (c)(1),
(2) Date: Apr. 11, 2016

(87) PCT Pub. No.: WO2015/073012
PCT Pub. Date: May 21, 2015

(65) Prior Publication Data
US 2016/0251952 A1    Sep. 1, 2016

(51) Int. Cl.
*E21B 44/00* (2006.01)
*E21B 47/12* (2012.01)
*H04L 29/08* (2006.01)
*H04W 4/38* (2018.01)

(52) U.S. Cl.
CPC .......... *E21B 44/005* (2013.01); *E21B 47/12* (2013.01); *H04L 67/12* (2013.01); *H04W 4/38* (2018.02)

(58) Field of Classification Search
CPC ......... E21B 44/005; E21B 47/12; G01V 3/20; H04W 4/006; H04L 67/12
See application file for complete search history.

(56) References Cited

U.S. PATENT DOCUMENTS

| | | | |
|---|---|---|---|
| 3,465,239 A * | 9/1969 | Delatorre | E21B 41/0085 323/909 |
| 4,176,555 A * | 12/1979 | Dorman | G01D 5/14 324/611 |
| 4,508,168 A | 4/1985 | Heeren et al. | |
| 6,541,996 B1 | 4/2003 | Rosefield et al. | |
| 6,798,237 B1 | 9/2004 | Wang et al. | |
| 7,068,065 B1 | 6/2006 | Nasrullah | |

(Continued)

FOREIGN PATENT DOCUMENTS

| | | |
|---|---|---|
| EP | 0072647 | 2/1983 |
| WO | 2015/0743012 | 5/2015 |

OTHER PUBLICATIONS

PCT International Search Report and Written Opinion, dated Aug. 14, 2014, Appl No. PCT/US2013/070158, "Downhole Tool Methods and Systems with Variable Impedance Control," Filed Nov. 14, 2013, 17 pgs.

*Primary Examiner* — Michael R Wills, III
(74) *Attorney, Agent, or Firm* — Benjamin Fite Tumey L.L.P.

(57) ABSTRACT

A disclosed method includes outputting, by an electrical component residing in a downhole tool, a clocked digital output. The method also includes adjusting, by a variable impedance circuit external to the electrical component, an impedance value in series with the clocked digital output as a function of temperature.

18 Claims, 8 Drawing Sheets

(56) References Cited

U.S. PATENT DOCUMENTS

| | | |
|---|---|---|
| 7,646,213 B2 | 1/2010 | Kao |
| 7,888,962 B1 | 2/2011 | Om |
| 7,961,000 B1 | 6/2011 | Gross |
| 9,632,203 B2 * | 4/2017 | Hopper .................... G01V 3/32 |
| 2004/0207403 A1 | 10/2004 | Fanini et al. |
| 2004/0251983 A1 | 12/2004 | Hsu et al. |
| 2005/0270172 A1 | 12/2005 | Bailey et al. |
| 2009/0194296 A1 | 8/2009 | Gillian et al. |
| 2012/0001629 A1* | 1/2012 | Hopper .................... G01V 3/32 |
| | | 324/303 |
| 2012/0073798 A1 | 3/2012 | Parsche et al. |

* cited by examiner

DOWNHOLE TOOL METHODS AND SYSTEMS WITH VARIABLE IMPEDANCE CONTROL

BACKGROUND

Efforts to increase clock rates and related data rates for electronic devices are ongoing. An electronic device with high-speed components may not work correctly if component impedances and transmission line impedance are mismatched. For example, impedance mismatches may cause voltage overshoots or undershoots that result in signal errors such as missed clock transitions or extraneous (false) clock transitions. To minimize mismatch effects, a component's output impedance may be adjusted with the addition of a series resistor. However, this solution does not work consistently in downhole applications, where high temperatures (e.g., up to 200° C.) can change component output impedances, component input impedances, and transmission line impedances in different ways. The effect of high-temperatures on component impedances and transmission line impedances can lead to scenarios where the mismatch is so large that a component is unable to drive the load appropriately. This leads to timing violations and improper operation that can be difficult to diagnose and rectify.

BRIEF DESCRIPTION OF THE DRAWINGS

Accordingly, there are disclosed herein various downhole circuit methods and systems with variable or temperature-dependent impedance control. In the drawings.

Figure 1:
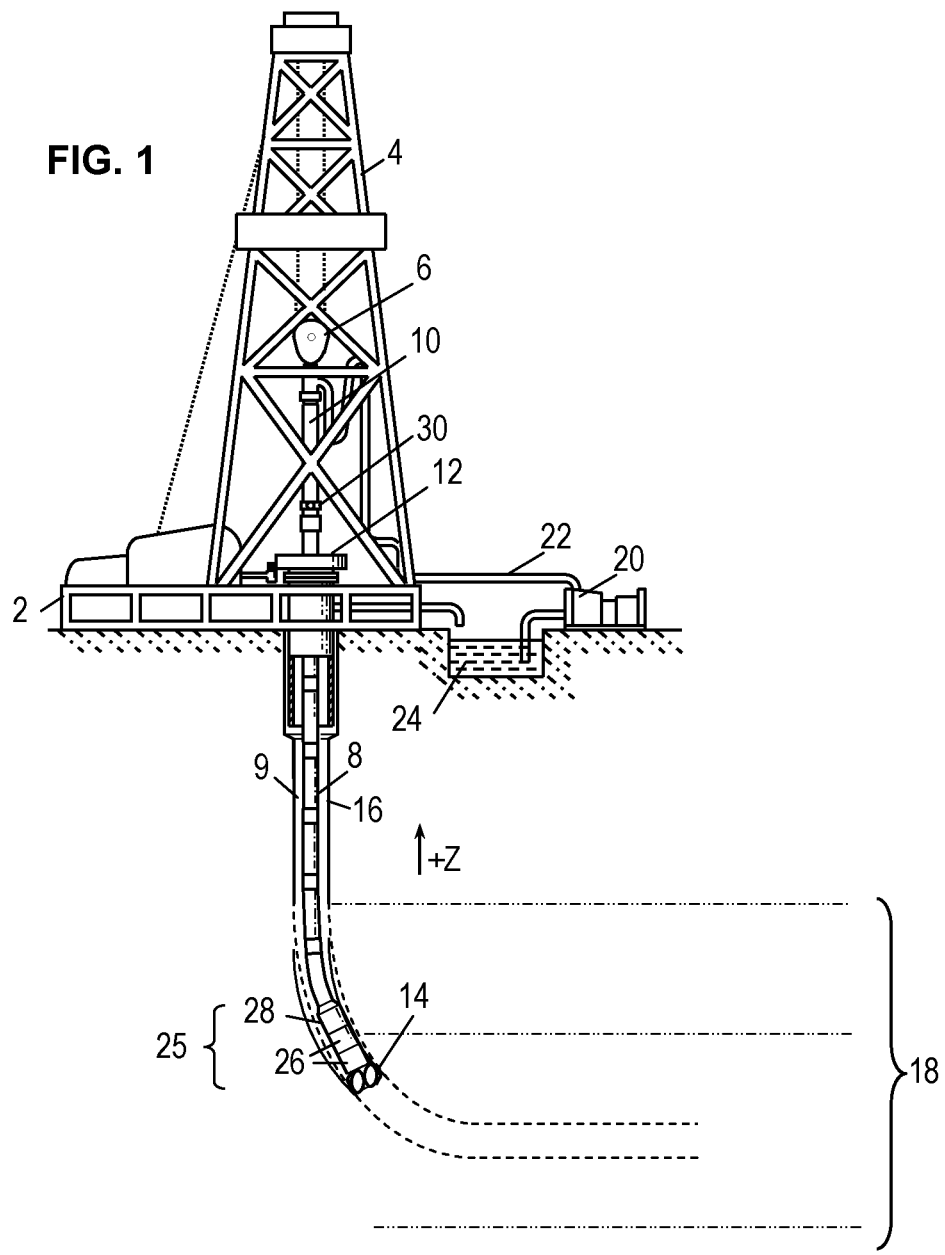
FIG. 1 shows an illustrative logging-while-drilling (LWD) tool environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

In at least some embodiments of the disclosed methods and system, variable (adaptive) impedance control is employed to adjust a termination resistance placed in series with a component's digital output (such as a clock output). As an example, different resistances can be selected for the termination resistance in response to a measured temperature. Additionally or alternatively, temperature-sensitive contacts and/or calibration techniques may be employed to select one of a plurality of resistance values for the termination resistance. In this manner, downhole tools are able to utilize high-speed components (e.g., 50 MHz or more) even in high-temperature environments (e.g., up to 200° C.), where component output impedances, component input impedances, and transmission line impedances are affected in different ways.

Without variable impedance control, impedance mismatches may cause downhole tools to fail in high-temperature environment (e.g., approximately 200° Celsius or more) due to digital timing violations. In such high-temperature environments, test equipment is not available to measure and observe the digital waveforms. So the timing margins (e.g., setup margins, hold time margins, rise time margins, fall time margins, high time margins, and/or low time margins) are unknown. In embedded systems, these margins are either known or need to be accounted for to prevent failure. Accordingly, in at least some embodiments, automated variable impedance control techniques are utilized to provide suitable margins and lower failure rates in the field.

The disclosed downhole circuit methods and systems with variable impedance control can be appreciated in the context of logging-while-drilling (LWD) environments, wireline logging environments, and/or downhole monitoring environments. FIG. 1 shows an illustrative LWD environment. In FIG. 1, a drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus 9 around drill string 8, and into a retention pit 24. The drilling fluid transports cuttings from the borehole 16 into the pit 24 and aids in maintaining the integrity of the borehole 16.

The drill bit 14 is just one piece of an open-hole LWD assembly that includes one or more drill collars 26 and logging tool 28. Drill collars 26 are thick-walled steel pipe sections that provide weight and rigidity for the drilling process. Logging tool 28 (which may be built into one of the drill collars) gathers measurements of various drilling or formation parameters. As an example, logging tool 28 may be integrated into the bottom-hole assembly 25 near the bit 14 to collect formation property measurements. The collected measurements may be plotted and used for steering the drill string 8 and/or to analyze formation properties. Without limitation, the logging tool 28 may collect resistivity/conductivity measurements, delta T sonic measurements, density logs, neutron porosity measurements, gamma ray measurements, repeat formation tests, seismic measurements, pore pressure measurements, compaction trend measurements, overlay calculations, and/or density/sonic cross-plots.

Measurements from the logging tool 28 can be acquired by a telemetry sub (e.g., integrated with logging tool 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used.

Figure 2:
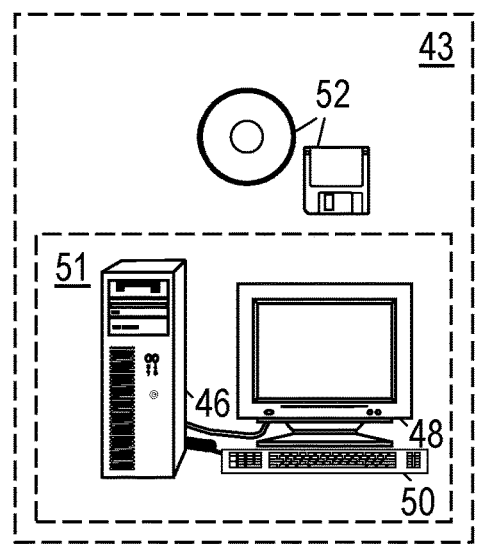
FIG. 2 shows an illustrative computer system.

In accordance with at least some embodiments, measurements collected from the logging tool 28 are processed by an illustrative computer system 43 (FIG. 2) executing a logging workflow management software tool with various options as described herein. The drilling crew can use computer system 43 for managing logging operations and/or steering operations. The computer system 43 may correspond to, e.g., an onsite logging facility, or a remote computing system that receives logging measurements from such logging facilities. The computer system 43 may include wired or wireless communication interfaces for receiving such logging measurements. As shown, the illustrative computer system 43 comprises user workstation 51 with a computer chassis 46 coupled to a display device 48 and a user input device 50. The display device 48 and user input device 50 enable an operator, for example, to interact with software executed by the workstation 51. The computer chassis 46 includes one or more information storage devices 52 (shown in FIG. 2 in the form of removable, non-transitory information storage media) for accessing software to manage drilling operations and/or steering operations. Such software may also be downloadable software accessed through a network (e.g., via the Internet).

Figure 3:
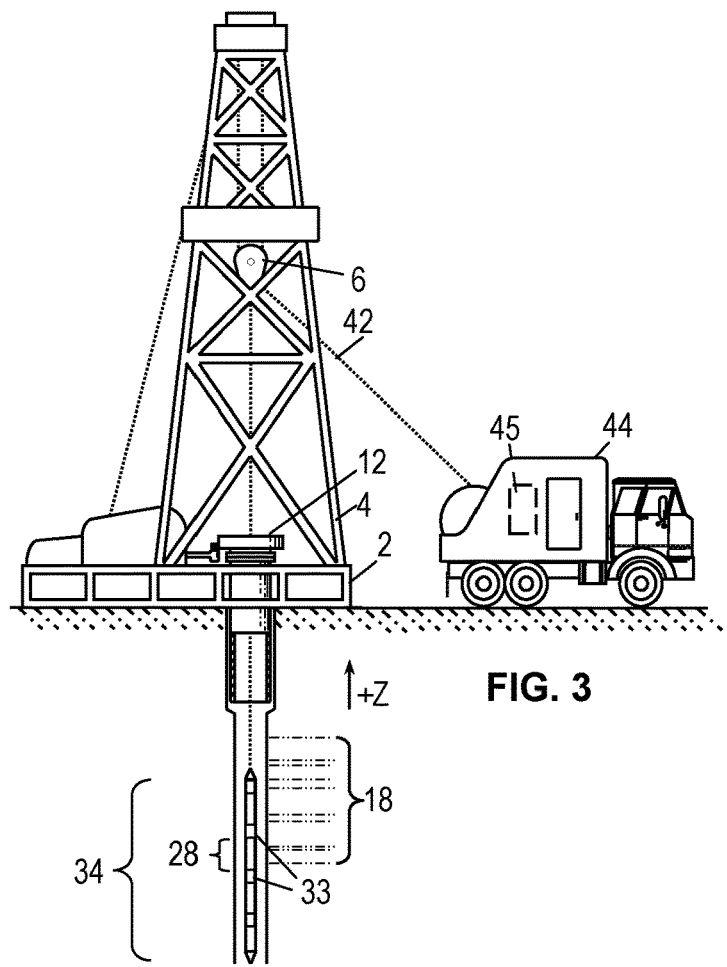
FIG. 3 shows an illustrative wireline tool environment.

At various times during the drilling process, the drill string 8 shown in FIG. 1 may be removed from the borehole 16. Once the drill string 8 has been removed, as shown in FIG. 3, logging operations can be conducted using a wireline logging string 34 (i.e., an assembly of wireline logging tools suspended by a cable 42 having conductors for transporting power to the tools and telemetry from the tools to the surface). It should be noted that various types of formation property sensors can be included with the wireline logging string 34. As shown, the illustrative wireline logging string 34 includes logging tool 28, which may collect log data as described herein. The logging tool 28 may be coupled to other modules of the wireline logging string 34 by one or more adaptors 33.

In FIG. 3, a wireline logging facility 44 collects measurements from the logging tool 28, and includes computing facilities 45 for managing logging operations, acquiring and storing the measurements gathered by the wireline logging string 34, and processing the measurements for display to an operator. The computing facilities 45 may correspond to computer system 43 or another computer that executes logging management software. In addition, software executed by computer system 43 or computing facilities 45 may be used for calibration of variable impedance control for a downhole circuit, to enable an operator to review variable impedance control results, and/or to enable an operator to select variable impedance control options. As an example, the calibration process may involve computer system 43 or computing facilities 45 monitoring or receiving notification of errors in the electronics of logging tool 28. In response, the computer system 43 or computing facilities 45 may direct electronic components of the logging tool 28 to be reset with a different impedance value for a clocked digital output of an electronic component.

Accordingly, in some embodiments, variable impedance control techniques are automated and self-contained in a downhole circuit. In other embodiments, variable impedance control techniques are automated, but involve analysis by a downhole computer or surface computer. In still other embodiments, variable impedance control techniques involve operator input via a computer system in communication with a downhole circuit with variable impedance control.

Figure 4:
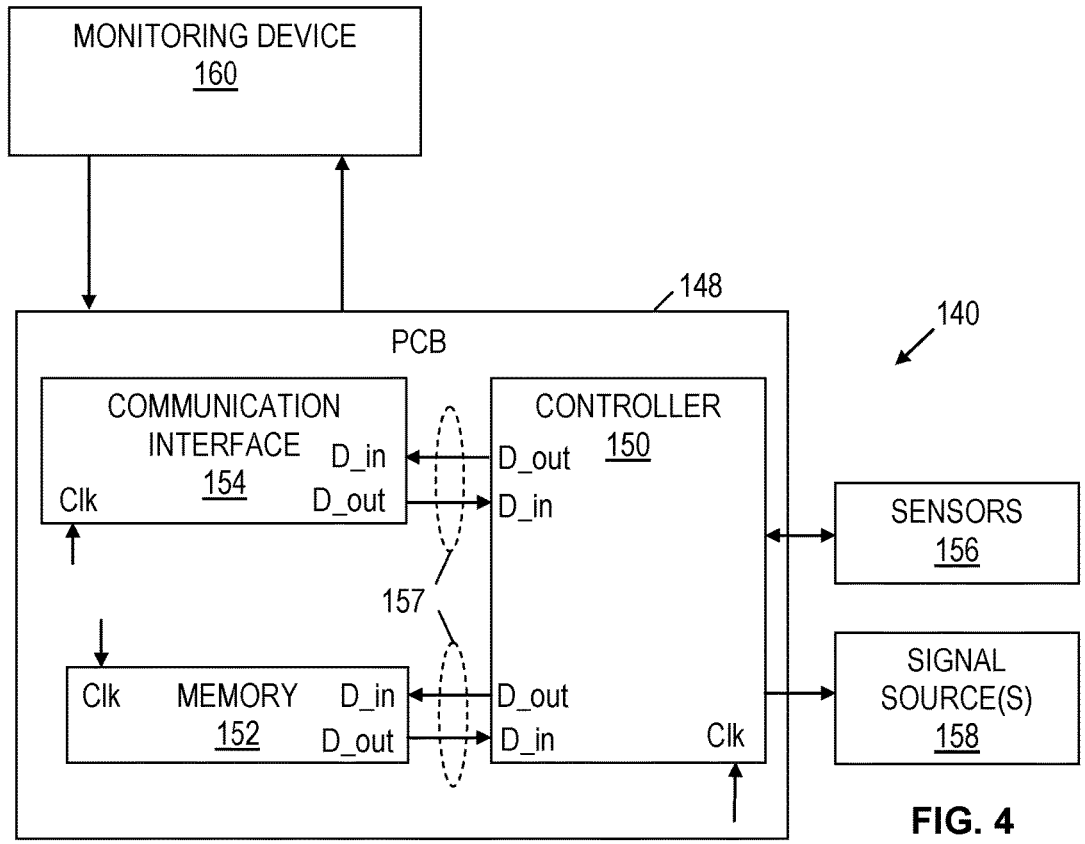
FIG. 4 shows a block diagram of an illustrative downhole tool.

FIG. 4 shows a block diagram of an illustrative downhole tool 140 representative of logging tool 28, a permanently (or long-term) deployed well monitoring tool (not shown), or other downhole tool. As shown, the downhole tool 140 includes a monitoring device 160 in communication with a printed circuit board (PCB) 148 having a controller 150, a memory 152, a communication interface 154, or other components with clocked digital outputs mounted thereon. The monitoring device 160 determines when electronics associated with the PCB 148 need to be reset due to erroneous settings and/or environment-induced errors. In at least some embodiments, the monitoring device 160 may reside on the PCB 148. Alternatively, the monitoring device 160 may be external to the PCB 148. In either case, the monitoring device 160 may monitor occurrence of errors for electronic components associated with PCB 148 or other PCBs. The monitoring device 160 also may track the impedance value of a clocked digital output for an electronic component associated with PCB 148 or other PCBs. The occurrence of errors and the tracked impedance value may be used for calibration of a variable impedance applied to an electronic component's clocked digital output as described herein. Again, such calibration may be performed internally within downhole tool 140 and/or may involve external computing, analysis, and/or operator input.

Returning to FIG. 4, the controller 150 may correspond to a processor, a microcontroller, or other hardware that executes software or firmware instructions. Further, the memory 152 may correspond to synchronous dynamic random access memory (SDRAM) such as single data rate (SDR) SDRAM or double data rate (DDR) SDRAM. Meanwhile, the communication interface 154 may correspond to a modem or other hardware/software to transmit digital data. Wired communications, wireless communications, and/or optical communications are possible.

As shown, the controller 150 also couples to sensors 156 and signal source(s) 158 that are not necessarily mounted to the PCB 148. The sensors correspond to active (powered) or passive sensors that sense physical characteristic such as temperature, pressure, vibration, electromagnetic field intensity, nuclear magnetic resonance echoes, among others. The signal source(s) 158 correspond to one or more powered signal sources that emit waves or wave patterns into a formation or borehole.

In at least some embodiments, the controller 150 manages operations such as collecting, storing, processing, and/or transmitting measurements collected by sensors 156. Such sensors 156 may collect data regarding the ambient formation and/or the ambient formation's response to a signal or signals generated by signal source(s) 158. The memory 152 may provide instructions or programs executable by controller 150. Additionally or alternatively, the memory 152 may store raw measurement data and/or processed measurement data. The communication interface 154 transmits the raw measurement data and/or the processed measurement data to the surface for later real-time use/analysis, or for later use/analysis. Thus, transmissions by the communication interface 154 may be continuous, periodic, or as requested.

In FIG. 4, the controller 150, the memory 152, and the communication interface 154 include a clock input pin (labeled Clk), at least one Data In pin (labeled D_in), and at least one Data Out pin (labeled D_out). As shown, D_out pins connect to D_in pins via transmission lines 157, and data transmissions between controller 150 and memory 152, or between controller 150 and communication interface 154, are driven by one or more clock signals. As disclosed herein, a variable impedance control circuit is employed between components such as controller 150, memory 152, and communication interface 154 to account for temperature-induced changes to component output impedance, component input impedance, and transmission line impedance.

Figure 5A:
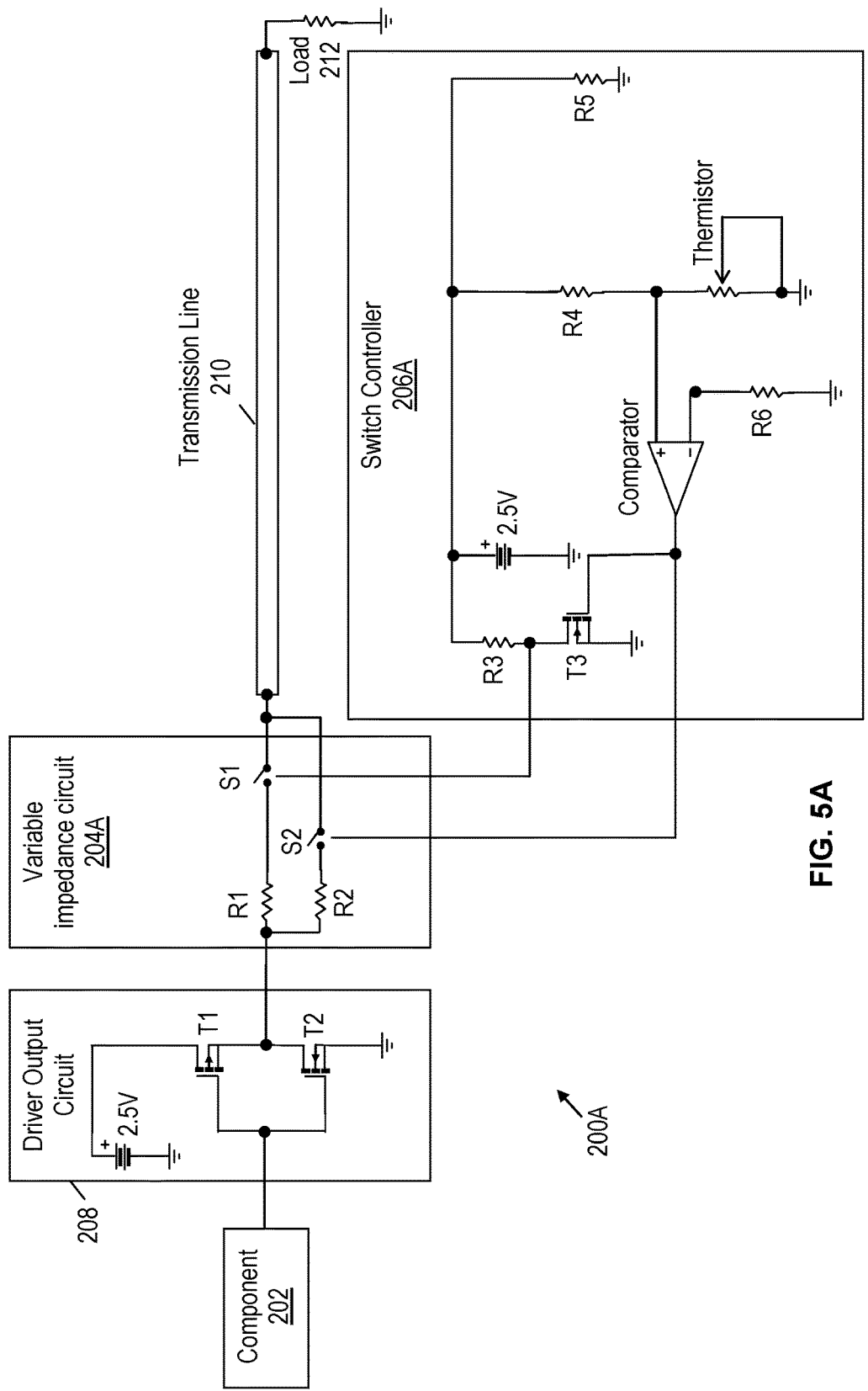
FIG. 5A shows an illustrative variable impedance control arrangement for a downhole circuit.
Figure 5B:
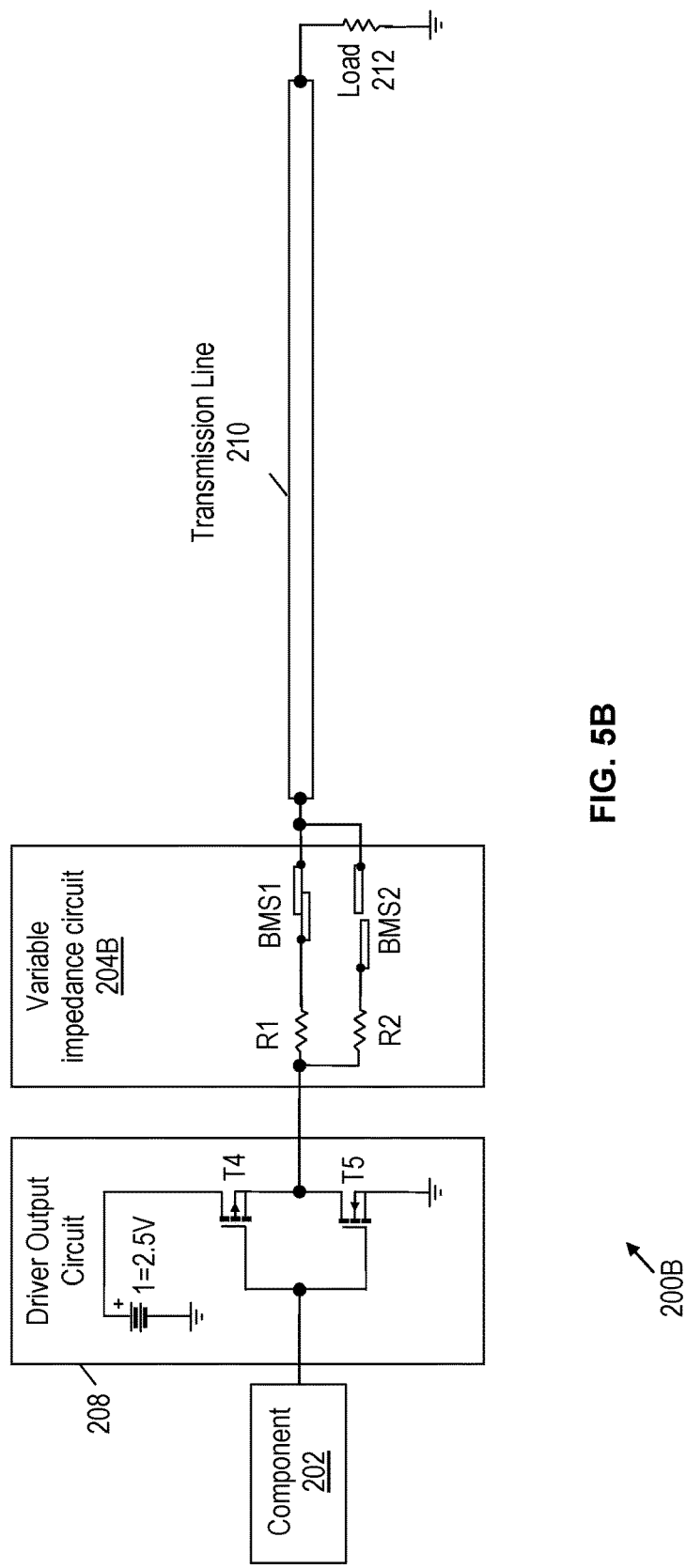
FIG. 5B shows another illustrative variable impedance control arrangement for a downhole circuit.
Figure 5C:
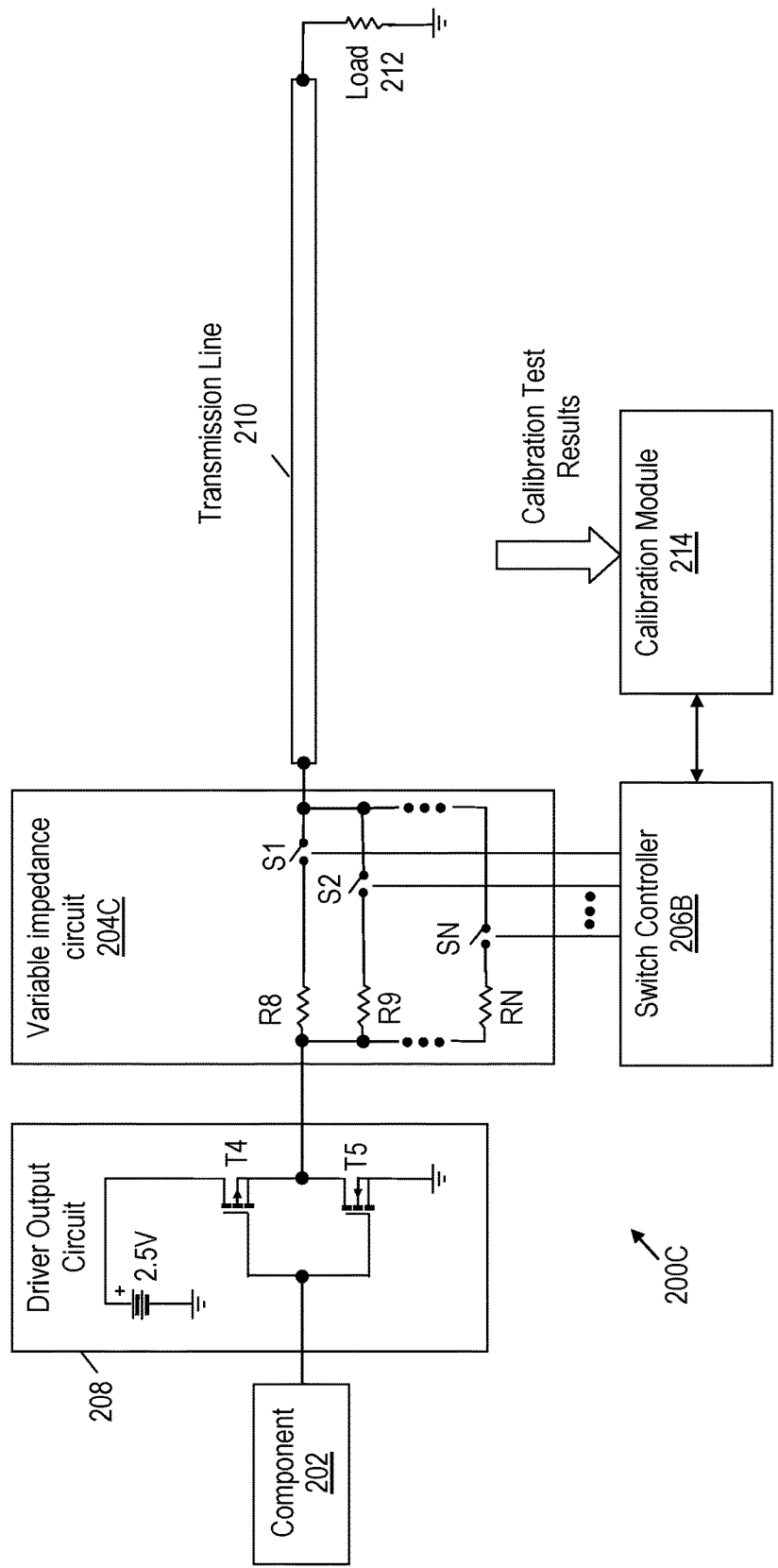
FIG. 5C shows yet another illustrative variable impedance control arrangement for a downhole circuit.

FIG. 5A-5C show illustrative variable impedance control arrangements 200A-200C for a downhole circuit. The arrangements 200A-200C may correspond to, for example, part of downhole tool 140. In FIG. 5A, the arrangement 200A includes a driver output circuit 208 coupled to a component 202 (e.g., controller 150, memory 152, or communication interface 154). For example, the driver output circuit 208 may be coupled to the output of memory 152. The driver output circuit 208 drives the voltage high (1.5 volts in this example) or low (0 volts in this example) using transistors T1 and T2 depending on a control signal from component 202. The signal output from the driver output circuit 208 is provided to a load 212 (e.g., another component) via variable impedance circuit 204A and transmission line 210 (e.g., corresponding to one of the transmission lines 157 of FIG. 4). For example, the circuits 208 and 204A may be coupled to a transmission line leading to the input of controller 150 or communication interface 154.

The variable impedance circuit 204A enables one of two resistors (R1 and R2) to be connected in series between the output of driver output circuit 208 and transmission line 210 using one or more switches (e.g., S1 and S2). In FIG. 5A, a switch controller 206A selects whether to connect R1 or R2 based on temperature sensing, where R2 is less than R1. For example, if the temperature sensed by a thermistor (or other temperature sensor) integrated or coupled to switch controller 206A is less than 85° Celsius, the switch controller 206A connects R1 by closing S1 and opening S2. On the other hand, if the temperature sensed by a thermistor (or other temperature sensor) integrated or coupled to switch controller 206A is equal to or greater than 85° Celsius, the switch controller 206A connects R2 by closing S2 and opening S1. The temperature comparison operation of switch controller 206A may be performed, for example, by a comparator and/or other logic.

When temperatures are sufficiently high, the impedance between component 202 and load 212 increases due to the unequal effect of temperature on component 202, the transmission line 210, and the load 212. If temperature-induced impedance increases by more than a threshold, the quality (e.g., rise time, stability) of the signal output from the driver output circuit 208 is negatively affected such that load 212 cannot be driven properly. To address the issue, the switch controller 206A selects R2 instead of R1 (the value of R2 being less than R1) when temperatures are higher than a threshold to reduce the termination resistance applied at the output of component 202. In this manner, signal quality issues between component 202 and load 212 are prevented or minimized.

As an example, the value of transmission line 210 may vary between 60 to 100 ohms depending on the temperature. Meanwhile, R1 may have a value of around 50 ohms, and R2 may have a value of around 30 ohms. In some embodiments, the value for each of R3-R6 may be around 10K ohms. In some embodiments, the variable impedance circuit 204A includes additional resistors and switches, and switch controller 206A provides finer levels of temperature-based control to select a particular termination resistor.

In the arrangement 200B of FIG. 5B, an alternative variable impedance circuit 204B is employed. The variable impedance circuit 204B includes temperature-sensitive contacts or switches (BMS1 and BMS2) to switch between R1 and R2. In one example, the temperature-sensitive contacts or switches for variable impedance circuit 204B are constructed from bi-metal materials that bend and/or stretch as a function of temperature. Such bi-metal materials could be integrated with a printed circuit board (PCB) and/or components soldered to a PCB.

In the arrangement 200C of FIG. 5C, an alternative variable impedance circuit 204C is employed as well as an alternative switch controller 206B. The variable impedance circuit 204C enables one of a plurality of resistors (R1 to RN) to be connected in series between the output of driver output circuit 208 and transmission line 210 using one or more switches (e.g., S1 to SN). In at least some embodiments, the switch controller 206B selects one of the resistors R1 to RN based on calibration test results rather than direct temperature sensing. As an example, a calibration module 214 integrated with or in communication with switch controller 206B may cause the switch controller 206B to connect different termination resistances provided by variable impedance circuit 204C for a predetermined period of time used to test the signal quality with the particular termination resistance. The results of such calibration tests may be detected, stored, and/or reported as errors, timing violations, or other quality criteria associated with the signal output by driver output circuit 208 to the load 212. In some embodiments, the calibration module 214 corresponds to a downhole processor and memory module with executable instructions. Alternatively, the calibration module 214 corresponds to an application-specific integrated circuit (ASIC), microcontroller, or other circuit with programming to perform the calibration periodically or as needed. In some embodiments the system performance is evaluated for all possible configurations of the variable impedance circuit and the calibration module identifies a window of impedance values that enable proper system performance. The calibration module then sets the configuration for an impedance value near the center of the window.

Figure 6A:
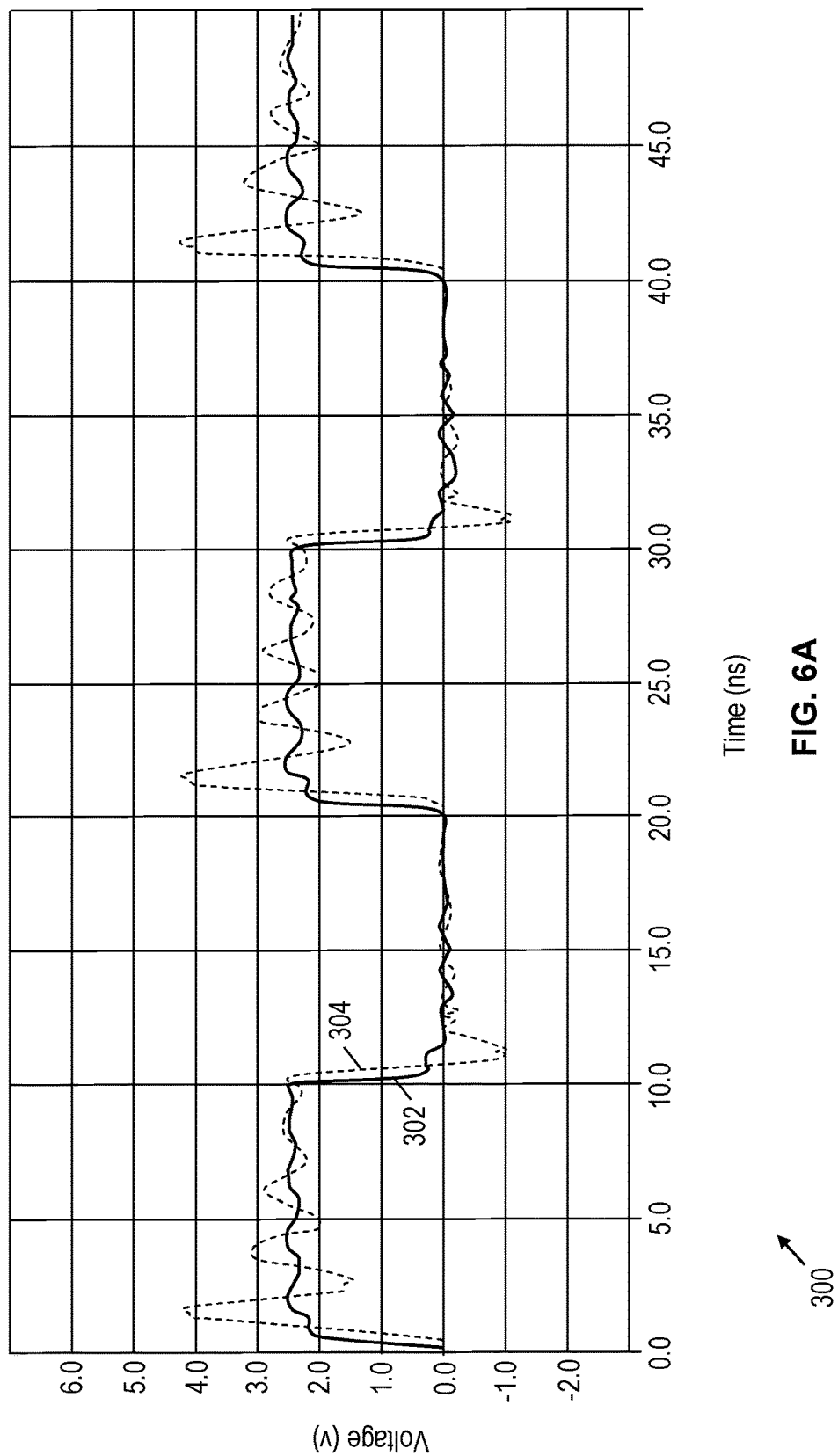
FIG. 6A shows an illustrative signal timing diagram without variable impedance control.

FIG. 6A shows an illustrative signal timing diagram 300 without variable impedance control. In diagram 310, the signal 302 (solid line) is the signal output from driver output circuit 208, while signal 304 (dashed line) is the signal received at the load 212. As shown, signal 302 has a "high" state of approximately 2.5 volts and a "low" state of approximately 0 volts. Meanwhile, signal 304 has ringing due to impedance mismatches, which causes its "high" state to drop below 2.0 volts. Such ringing may cause an incorrect value to be discerned at the load 212. Another issue caused by impedance mismatches is delayed rise times that may result in timing violations.

Figure 6B:
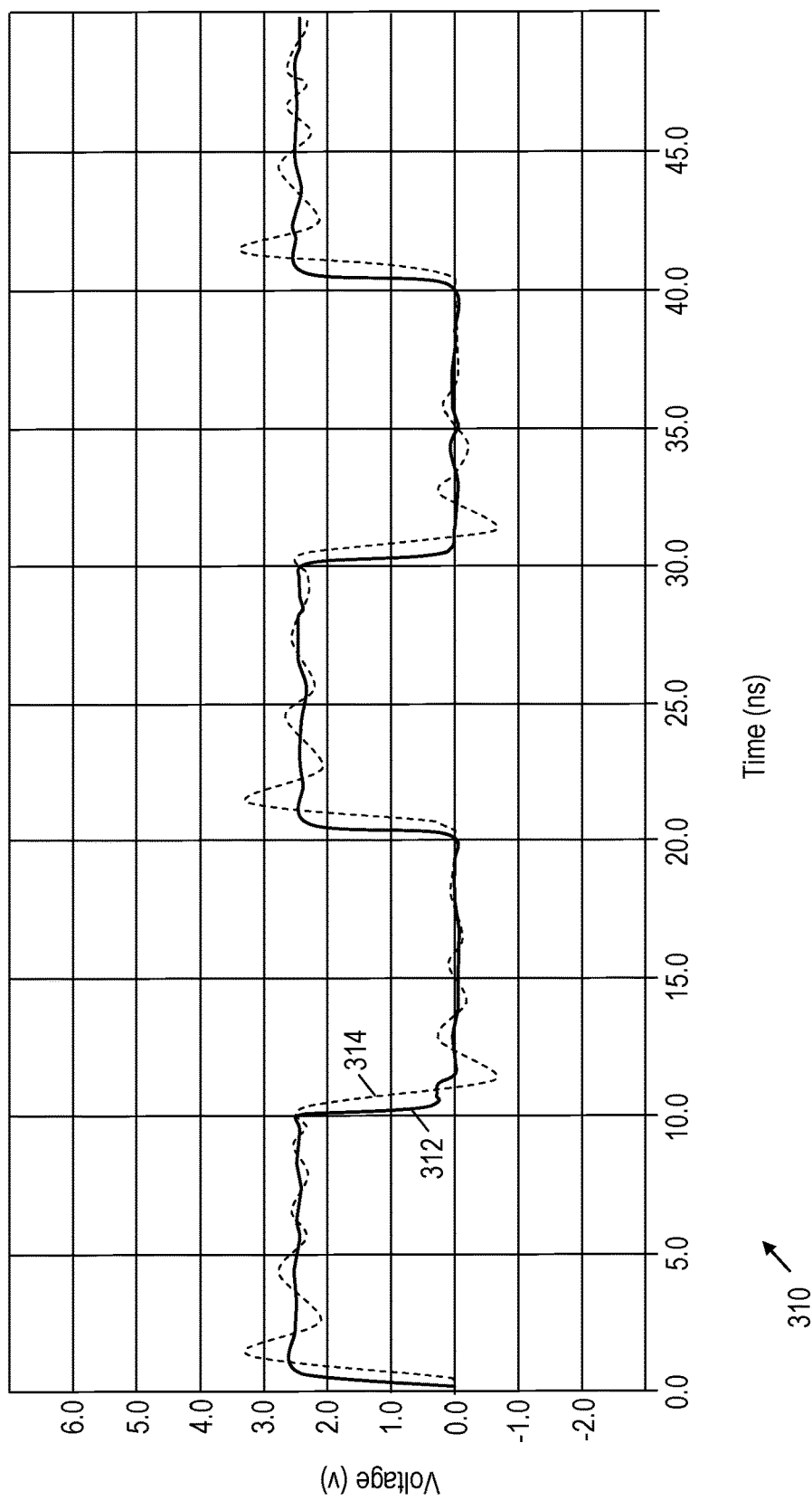
FIG. 6B shows an illustrative signal timing diagram with variable impedance control.

FIG. 6B shows an illustrative signal timing diagram with variable impedance control. In diagram 310, the signal 312 (solid line) is the signal output from driver output circuit 208, while signal 314 (dashed line) is the signal received at the load 212. As shown, signal 312 has a "high" state of approximately 2.5 volts and a "low" state of approximately 0 volts. Although signal 314 has some ringing due to impedance mismatches, the level of ringing is smaller (compared to signal 304 of FIG. 6A) and its "high" state does not drop below 2.0 volts. With variable impedance control, the correct signal value can be discerned at the load 212 and timing violations are reduced.

Figure 7:
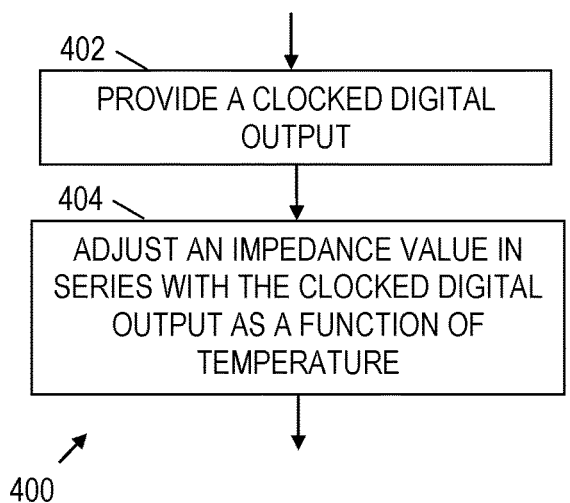
FIG. 7 shows a flowchart of an illustrative method for a downhole tool with variable impedance control.

FIG. 7 shows a flowchart of a downhole tool method 400 with variable impedance control. The method 400 may be performed by logging tool 28, downhole tool 140, and/or related computers or control systems. As shown, the method 400 comprises providing a clock digital output at block 402. For example, the clocked digital output may be provided by controller 150, memory 152, communication interface 154, or another electronic component residing in logging tool 28 or downhole tool 140. At block 404, an impedance value in series with the clocked digital output is adjusted as a function of temperature. The impedance value may be adjusted, for example, by a variable impedance circuit (e.g., circuits 204A-204C) as described herein. Note the function of temperature on the impedance adjustments described herein may be explicit (e.g., by direct measurement of temperature) or implicit (e.g., by use of temperature-sensitive contacts or calibration schemes).

Numerous other modifications, equivalents, and alternatives, will become apparent to those skilled in the art once the above disclosure is fully appreciated. For example, the switches may be actuated one at a time or in combinations that combine the resistors in different parallel combinations. Some embodiments may eliminate the switch for one of the resistors to ensure that there always exists at least one signal path, and the remaining resistors sized to provide the desired impedance values when combined in parallel with the fixed resistor. It is intended that the following claims be interpreted to embrace all such modifications, equivalents, and alternatives where applicable.

What is claimed is:

1. A method, comprising:
   providing, by an electrical component residing in a downhole tool, a clocked digital output; and
   adjusting, as a function of temperature, an impedance value in series with said clocked digital output, wherein said adjusting comprises one or more temperature-sensitive contacts, wherein the one or more temperature-sensitive contacts comprise bi-metal contacts,
   wherein said adjusting is performed by a variable impedance circuit external to the electrical component.

2. The method of claim 1, wherein said adjusting comprises operating one or more switches external to the electrical component based on a sensed temperature value.

3. The method of claim 1, wherein said adjusting comprises operating one or more switches external to the electrical component based on a calibration that tests signal quality related to said clocked digital output as a function of different impedance value options of the variable impedance circuit.

4. The method of claim 3, further comprising performing the calibration while the downhole tool is in a borehole.

5. The method of claim 3, further comprising performing the calibration before the downhole tool is placed in a borehole.

6. The method of claim 1, wherein the one or more temperature-sensitive contacts are external to the electrical component for opening a first path associated with a first termination resistance value and for closing a second path associated with a second termination resistance value.

7. The method of claim 1, further comprising comparing a sensed temperature value to a threshold, and direct said adjusting based on the comparison.

8. The method of claim 1, wherein the downhole tool corresponds to a logging while drilling (LWD) tool, and wherein the electrical component is mounted to a printed circuit board (PCB) and corresponds to a memory device, a communication interface, or a controller.

9. The method of claim 1, wherein the downhole tool corresponds to a wireline logging tool, and wherein the electrical component is mounted to a printed circuit board (PCB) and corresponds to a memory device, a communication interface, or a controller.

10. A downhole tool, comprising:
    a printed circuit board (PCB) having an electrical component with a clocked digital output; and
    a variable impedance circuit external to the electrical component to adjust, as a function of temperature, an impedance value in series with said clocked digital output, wherein the variable impedance circuit comprises one or more temperature-sensitive contacts to selectively connect one of the plurality of resistors in series with the clocked digital output, wherein the one or more temperature-sensitive contacts comprise a bi-metal component.

11. The downhole tool of claim 10, wherein the variable impedance circuit comprises:
    a plurality of resistors; and
    one or more switches to selectively connect one of the plurality of resistors in series with the clocked digital output.

12. The downhole tool of claim 10, wherein the variable impedance circuit comprises
    a plurality of resistors.

13. The downhole tool of claim 10, further comprising a switch controller coupled to 30 the variable impedance circuit, wherein the switch controller includes or is in communication with a temperature sensor.

14. The downhole tool of claim 10, further comprising a switch controller coupled to variable impedance circuit, wherein the switch controller includes or is in communication with a calibration module that tests different impedance value options of the variable impedance circuit.

15. The downhole tool of claim 10, wherein the PCB further includes a transmission line between the electrical component and a load driven by the clocked digital output, wherein the variable impedance circuit is between the electrical component and the transmission line.

16. The downhole tool of claim 10, wherein the downhole tool corresponds to a logging while drilling (LWD) tool.

17. The downhole tool of claim 10, wherein the downhole tool corresponds to a wireline logging tool.

18. The downhole tool of claim 10, wherein the electrical component corresponds to synchronous dynamic random access memory (SDRAM).

* * * * *